US011251885B2

(12) United States Patent
Koellner et al.

(10) Patent No.: US 11,251,885 B2
(45) Date of Patent: Feb. 15, 2022

(54) ANTENNA MODULE AND TEST SYSTEM

(71) Applicant: Rohde & Schwarz GmbH & Co. KG, Munich (DE)

(72) Inventors: Guenter Koellner, Munich (DE); Markus Gallhauser, Munich (DE); Nino Voss, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 0 days.

(21) Appl. No.: 16/727,268

(22) Filed: Dec. 26, 2019

(65) Prior Publication Data

US 2021/0203424 A1 Jul. 1, 2021

(51) Int. Cl.
*H04B 7/00* (2006.01)
*H04B 17/29* (2015.01)

(52) U.S. Cl.
CPC .................................. *H04B 17/29* (2015.01)

(58) Field of Classification Search
CPC ....................................................... H04B 17/29
USPC ....................................................... 455/67.12
See application file for complete search history.

(56) References Cited

U.S. PATENT DOCUMENTS

| 2016/0050032 | A1* | 2/2016 | Emerson | H01Q 1/38 455/115.2 |
| 2016/0223679 | A1* | 8/2016 | Bai | G01R 29/105 |
| 2016/0254870 | A1* | 9/2016 | O'Keeffe | H01Q 3/267 455/67.14 |
| 2017/0104576 | A1* | 4/2017 | Liu | H04B 1/525 |
| 2018/0239014 | A1* | 8/2018 | McMahon | A61B 5/7225 |
| 2020/0119460 | A1* | 4/2020 | Maruo | G01R 29/105 |
| 2020/0177289 | A1* | 6/2020 | Maruo | G01R 29/105 |

FOREIGN PATENT DOCUMENTS

WO 2017/029284 A1 2/2017

* cited by examiner

*Primary Examiner* — April G Gonzales
(74) *Attorney, Agent, or Firm* — Christensen O'Connor Johnson Kindness PLLC

(57) ABSTRACT

An antenna module for over-the-air testing, the antenna module comprises a signal generation module, a measurement module, and an antenna. The signal generation module comprises a control input. The measurement module comprises an analog output. The antenna is assigned to the measurement module and the signal generation module. The signal generation module comprises a signal generator and a control unit assigned to the control input. The control unit is configured to receive a control signal via the control input. The control unit is configured to process the control signal received via the control input, thereby controlling output of the signal generation module. Further, a test system is described.

16 Claims, 1 Drawing Sheet

ANTENNA MODULE AND TEST SYSTEM

FIELD OF THE DISCLOSURE

Embodiments of the present disclosure relate generally to an antenna module for over-the-air (OTA) testing. Further, embodiments of the present disclosure relate generally to a test system for radio frequency (RF) testing.

BACKGROUND

In the state of the art, test systems are known that are used for over-the-air testing of a device under test, also known as radio frequency (RF) testing. Typically, a device under test (DUT) is exposed to a certain radio frequency signal in order to determine the characteristics and/or properties of the device under test. The test systems known so far for radio frequency testing usually comprise a separate analog signal generator connected with an antenna as well as a separate control unit that controls the signal generator.

These separately formed components are interconnected with each other by means of cables which, however, result in calibration issues, as the same cables used during calibration have to be used for subsequent testing, ensuring a correctly calibrated test system.

In addition to the above-mentioned issue, the test systems as well as the respective antenna modules assigned to the test system are not capable of providing radio frequency pulses for testing the device under test in order to evaluate the characteristics and/or properties of the device under test when receiving radio frequency signal pulses.

Accordingly, there is a need for an antenna module and a test system that are enabled to test the respective characteristics and/or properties of a device under test over-the-air with respect to radio frequency pulses.

SUMMARY

Embodiments of the present disclosure provide an antenna module for over-the-air testing. In some embodiments, the antenna module comprises a signal generation module, a measurement module and an antenna. The signal generation module comprises a control input. The measurement module comprises an analog output. The antenna is assigned to the measurement module and the signal generation module. The signal generation module comprises a signal generator and a control unit assigned to the control input. The control unit is configured to receive a control signal via the control input. The control unit is configured to process the control signal received via the control input, thereby controlling output of the signal generation module.

Accordingly, the signal generation module generates an analog radio frequency (RF) signal, particularly a radio frequency signal pulse. The respective radio frequency signal, for example the radio frequency pulse, has short rising times as well as short falling times, resulting in steep signal edges. This can be ensured by the integrative construction of the antenna module, as the signal generation module comprises the signal generator and the control unit.

For instance, the entire antenna module has a (single) housing that encompasses the signal generation module as well as the measurement module.

Thus, a small and cost-efficient antenna module is provided that can be used for radio frequency testing for example over-the-air (OTA) testing.

Furthermore, the integrative construction of the antenna module ensures that the entire antenna module can be calibrated, as no separate cables have to be used for interconnecting the respective components.

In general, the antenna module corresponds to an over-the-air (OTA) signal pulse generator combined with a meter, namely the measurement module.

In some embodiments, the antenna module is configured to output a radio frequency signal (pulse) within the microwave range, for instance between 300 MHz and 300 GHz, particularly a radio frequency signal (pulse) assigned to Ultra High Frequency (UHF), Super High Frequency (SHF) or Extremely High Frequency (EHF).

The signal generation module is configured to generate such a radio frequency signal (pulse), namely an analog RF signal (pulse).

The measurement module is configured to perform an analog measurement on the radio frequency signal (pulse), namely the analog RF signal (pulse). As the measurement module has an analog output, an analog measurement result is outputted by means of the measurement module. Accordingly, the measurement module corresponds to an analog measurement module that has an analog output.

An aspect provides that the control unit is configured to control output of signal generation module by digital controlling. The digital controlling ensures that short pulses with respect to time are outputted by the signal generation module. In other words, the signal generation module may be controlled in a digital manner, for example its signal generator. The signal generator may receive a digital signal that is processed internally to output an analog radio frequency signal (pulse) that is forwarded to the antenna for being transmitted. Then, the radio frequency signal (pulse) propagates towards the device under test for testing purposes.

Another aspect provides that the control unit is configured to control the output of the signal generation module faster than 100 ns. For instance, switching times of 25 ns can be obtained. Accordingly, short radio frequency pulses may be outputted by the antenna module, for example the signal generation module. Due to the fast switching times, the respective signal edges are steep. In fact, the rising signal edge and/or the falling signal edge may have a duration of (about) 2 ns.

The control unit may be configured to control the signal generator. Thus, the control unit has direct influence on the signal generator, for example the radio frequency signal (pulse) generated. For instance, a modulation or any other characteristics of the radio frequency signal (pulse) can be adapted/set by the control unit. In other words, the characteristics of the radio frequency signal (pulse) generated are adapted in an appropriate manner so as to obtain the intended radio frequency signal (pulse). Furthermore, the control unit may control the output of the signal generator, namely the transmission time when the respective radio frequency signal (pulse) shall be outputted.

Furthermore, the signal generation module may comprise a switchable output assigned to the signal generator. The control unit is configured to control the switchable output. The switchable output may relate to a separately formed component of the signal generation module that is located downwards with respect to the signal generator. For instance, the switchable output relates to a switch or rather a switching unit that is controlled by means of the control unit so as to open or close a transmission line departing from the signal generator.

Thus, the radio frequency signal (pulse) generated by the signal generator is forwarded to the switchable output, which is controlled by the control unit. The switchable output has fast switching times such that the short radio frequency pulses can be generated by switching the switchable output back and forth. In other words, the radio frequency pulses are generated by fast switching the switchable output that is controlled by the control unit (in a digital manner).

The measurement module may comprise an additional digital output. Hence, a measurement value can be outputted by the measurement module in a digital manner. This measurement value can be used for further processing.

According to a certain embodiment, the control input is an analog control input. Therefore, an analog control signal is inputted that is converted by the control unit into a digital control signal that is forwarded to the signal generator and/or the switchable output for controlling purposes.

In an alternative embodiment, the control input is a digital input. Thus, digital control signals are directly received that are processed by the control unit in a digital manner for directly controlling the signal generator and/or the switchable output.

The antenna may be permanently connected with the measurement module and/or the signal generation module. Thus, the antenna is connected with the measurement module and/or the signal generation module by a signal line.

Alternatively, the antenna may be connected with the measurement module and/or the signal generation module via a switch. The respective switch may be located within the signal line that interconnects the antenna with the measurement module and/or the signal generation module. The switch may be provided additionally to the fast switching output.

In some embodiments, the antenna is located between the signal generation module and the measurement module, wherein a branch line branches off from a mainline that connects the signal generation module and the measurement module.

Further, a splitter may be provided via which the antenna is connected with the signal generation module. Hence, the splitter is located between the signal generation module and the measurement module, wherein a branch line branches off from the splitter, which ends at the antenna. Thus, the radio frequency signal (pulse) generated by the signal generation module is split into at least two different radio frequency signal portions that are forwarded to the antenna and the measurement module in parallel. The respective radio frequency signal (pulse) portion is transmitted to the antenna and the measurement module, respectively, wherein the antenna outputs a first radio frequency signal (pulse) portion and the measurement module measures a second radio frequency signal (pulse) portion simultaneously.

According to an aspect, the measurement module may be a power measurement module. Thus, the power of the radio frequency signal (pulse), for example the respective portion, is measured by the measurement module in an analog manner. Put differently, the measurement module relates to an analog measurement module.

For instance, the measurement module comprises a diode and/or a thermal measurement circuit or unit. Thus, the analog measurement can be established by the respective component of the measurement module, namely the diode and/or the thermal measurement unit.

Further, embodiments of the present disclosure provide a test system for radio frequency testing. In some embodiment, the test system comprises a central unit and at least one antenna module as described above. The central unit is connected with the antenna module. The test system can be used for testing the device under test, wherein the central unit provides the respective control signals to the antenna module for controlling the antenna module, for example the output of the radio frequency signal (pulse).

In some embodiments, the test system comprises several antenna modules that are connected with the central unit. Thus, the test system can be used for multiple-input multiple-output (MIMO) testing of the device under test.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Figure 1:
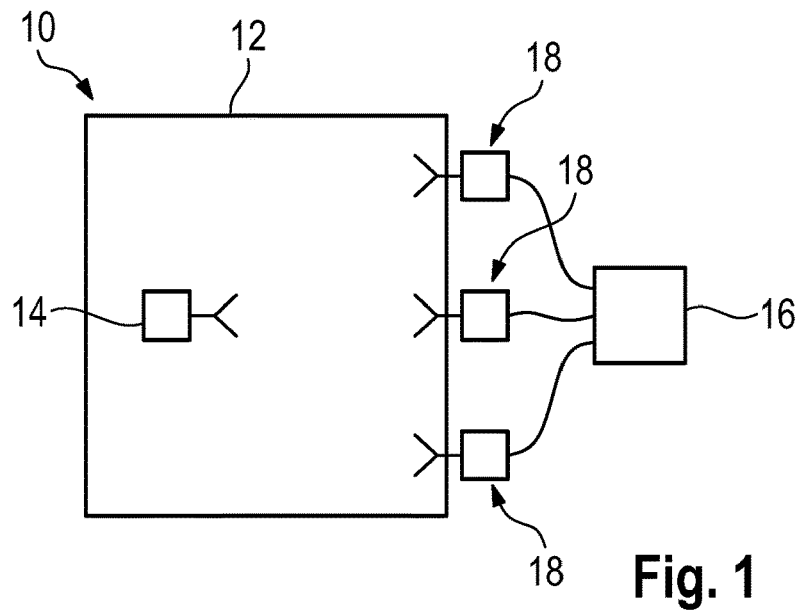
FIG. 1 shows a schematic overview of a representative test system according to the present disclosure.

In FIG. 1, a test system 10 for radio frequency testing is shown that comprises a testing chamber 12 in which a device under test 14 is located. The testing chamber 12 may be an anechoic chamber.

Further, the test system 10 comprises a central unit 16 that is connected with several antenna modules 18 that are assigned to the testing chamber 12 in which the device under test 14 is located. Each of the antenna modules 18 is controlled by the central unit 16 as will be described hereinafter with respect to FIG. 2 illustrating a single antenna module 18 in more detail.

In some embodiments, the antenna module 18 is used for over-the-air testing or rather radio frequency testing, as it provides a radio frequency signal that is forwarded to the device under test 14 for testing purposes.

Figure 2:
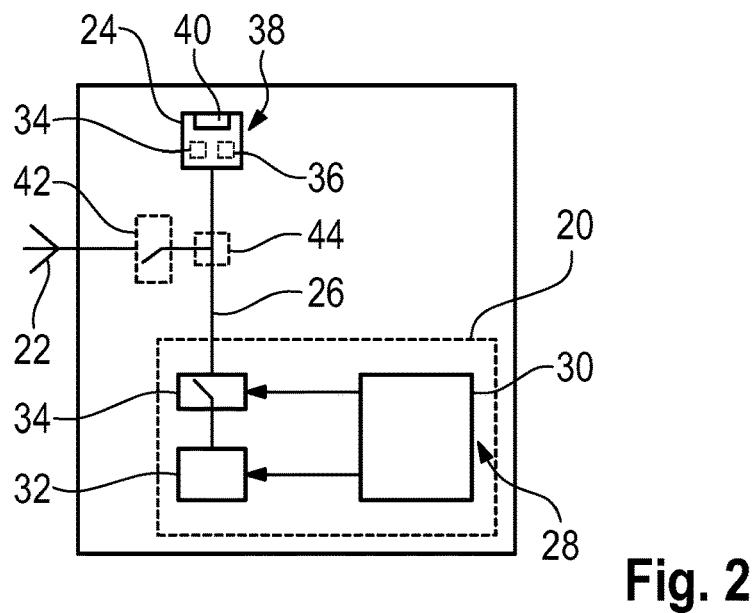
FIG. 2 shows a schematic overview of a representative antenna module according to the present disclosure.

As shown in FIG. 2, the antenna module 18 comprises a signal generation module 20, an antenna 22 and a measurement module 24. The antenna 22 is connected with a main line 26, also called main transmission line, that connects the signal generation module 20 and the measurement module 24.

In the embodiment shown, the signal generation module 20 comprises a control input 28 that is assigned to a control circuit or unit 30 of the signal generation module 20.

In general, the control input 28 may relate to a digital control input such that the central unit 16 outputs a digital signal that is processed by the control unit 30 directly. Alternatively, the control input 28 may be an analog control input such that an analog signal is processed/converted by the control unit 30 into a digital signal.

The signal generation module 20 further comprises a signal generator 32 as well as a switchable output 34 that is assigned to the signal generator 32. The switchable output 34 is located downstream of the signal generator 32, namely between the antenna 22 and the signal generator 32. The switchable output 34 may be established by a switch or rather a switching unit, for example a fast switching one.

In general, the signal generation module 20 receives via its control input 28 a control signal that may be issued by the central unit 16. The control signal received via the control input 28 is forwarded to the control unit 30 that is configured to receive the control signal and to process the control signal. Depending on the control signal, the control unit 30 controls output of the signal generation module 20. In the embodiment shown, the control unit 30 controls the signal generator 32 and the switchable output 34 as illustrated in FIG. 2. In some embodiments, a digital controlling is established by the control unit 30.

Figure 3:
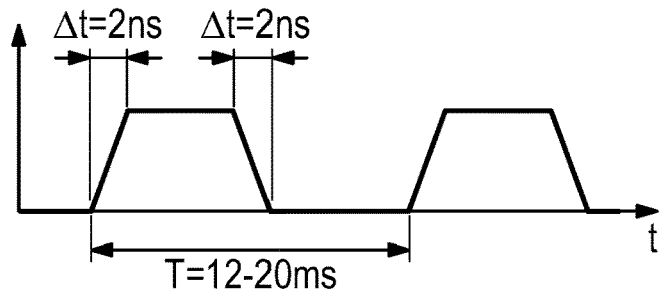
FIG. 3 shows a radio frequency signal pulse generated and outputted by a representative antenna module according to the present disclosure.

This ensures that very short (in time) radio frequency pulses with short rising times and short falling times can be generated that are forwarded to the antenna 22. A respective illustration of such a radio frequency signal is shown in FIG. 3.

In some embodiments, the control unit 30 controls output of the signal generation module 20 by means of digital controlling, as digital signals are outputted by the control unit 30 that are used to control the signal generator 32 and/or the switchable output 34 as shown in FIG. 2. Thus, the switchable output 34 as well as the signal generator 32 may receive a digital signal that is processed internally by the respective component.

In general, the signal generation module 20 is enabled to output a radio frequency signal, for example a radio frequency pulse, faster than 100 ns. In some embodiments, the edge times are (about) 2 ns as shown in FIG. 3. Thus, very short radio frequency pulses having steep signal edges can be generated by means of the signal generation module 20.

The radio frequency pulses propagate along the main line 26 towards the antenna 22 via which the radio frequency pulses are outputted in order to test the characteristics and/or properties of the device under test 14 with respect to these specific radio frequency pulses.

Furthermore, the radio frequency pulses propagate along the main line 26 towards the measurement module 24 that may measure the power of the radio frequency signal (pulse).

Thus, the measurement module 24 corresponds to a power measurement module. For this purpose, the measurement module 24 may comprise a diode 34 and/or a thermal measurement circuit or unit 36 as illustrated by dashed lines in FIG. 2.

Accordingly, the measurement module 24 relates to an analog power measurement module, as the diode 34 and/or the thermal measurement unit 36 provide an analog measurement result. Thus, the measurement module 24 in some embodiments has an analog output 38 via which the analog measurement result is outputted.

In addition to the analog output 38, the measurement module 24 may also comprise a digital output 40 via which a measurement value may be outputted in a digital manner, for example for further processing.

Generally, the antenna 22 may be permanently connected with the measurement module 24 and the signal generation module 20 via a respective line. Alternatively, a switch 42 may be provided so that the antenna 22 is connected with the measurement module 24 and/or the signal generation module 20 via the respective switch 42 as illustrated by the dashed lines in FIG. 2.

Furthermore, the antenna module 10 may have a splitter 44 that is interconnected between the signal generation module 20 and the antenna 22 as well as the measurement module 24. The optional splitter 44 is illustrated by dashed lines in FIG. 2.

The splitter 44 splits the radio frequency signal (pulse) generated by the signal generation module 20 into two signal portions that propagate towards the antenna 22 and the measurement module 24, respectively. Thus, two different radio frequency signal portions are provided that are processed differently, namely by the antenna 22 for forwarding the respective signal portion to the device under test 14 as well as by the measurement module 24 in order to measure the respective power of the radio frequency signal portion.

In general, an antenna module 18 as well as a test system 10 are provided that are enabled to generate short radio frequency pulses that can be used for over-the-air radio frequency testing of the device under test 14.

In some embodiments, a completely calibrated antenna module 18 is established that is smaller in dimensions and cost-efficient.

Certain embodiments disclosed herein utilize circuitry (e.g., one or more circuits) in order to implement protocols, methodologies or technologies disclosed herein, operably couple two or more components, generate information, process information, encode signals, decode signals, transmit and/or receive signals, etc. Circuitry of any type can be used. For example, as described above, the test system 10, the central unit 16, the antenna modules 18 (e.g., the signal generation module 20, the measurement module 24 the control unit 30, the signal generator 32, the switchable output 34, the thermal measurement unit 36, the switch 42, the splitter 44, etc.) or other components of the system may include, in some embodiments, logic for implementing the protocols, technologies and methodologies described herein. This logic of these components can be carried out in circuitry that includes, for example, hardware or a combination of hardware and software. In some embodiments, logic of these components is carried out in software.

In an embodiment, circuitry includes, among other things, one or more computing devices such as a processor (e.g., a microprocessor), a central processing unit (CPU), a digital signal processor (DSP), an application-specific integrated circuit (ASIC), a field-programmable gate array (FPGA), a system on a chip (SoC), or the like, or any combinations thereof, and can include discrete digital or analog circuit elements or electronics, or combinations thereof.

In an embodiment, circuitry includes a processor (e.g., a microprocessor), a central processing unit (CPU), or a digital signal processor (DSP), with or without programmable memory. In an embodiment, circuitry includes one or more ASICs having a plurality of predefined logic components. In an embodiment, circuitry includes one or more FPGA having a plurality of programmable logic components. In an embodiment, circuitry includes hardware circuit implementations (e.g., implementations in analog circuitry, implementations in digital circuitry, and the like, and combinations thereof).

In an embodiment, circuitry includes combinations of circuits and computer program products having software or firmware instructions stored on one or more computer readable memories that work together to cause a device to perform one or more protocols, methodologies or technologies described herein. In an embodiment, circuitry includes circuits, such as, for example, microprocessors or portions of microprocessor, that require software, firmware, and the like for operation. In an embodiment, circuitry includes an implementation comprising one or more processors or portions thereof and accompanying software, firmware, hardware, and the like.

In an embodiment, circuitry includes a baseband integrated circuit or applications processor integrated circuit or a similar integrated circuit in a server, a broadcast/streaming device, such as for example a cellular network device, an OTA network device, an OTT network device, a satellite network device, an internet protocol device, etc., and other network devices, or other computing devices. In an embodiment, circuitry includes one or more remotely located components. In an embodiment, remotely located components are operably coupled via wireless communication. In an embodiment, remotely located components are operably coupled via one or more receivers, transmitters, transceivers, or the like.

In an embodiment, circuitry includes one or more memory devices that, for example, store instructions or data. Non-limiting examples of one or more memory devices include volatile memory (e.g., Random Access Memory (RAM), cache memory, register memory, etc.), non-volatile memory (e.g., Read-Only Memory (ROM), flash drives, solid-state drives, etc.), or the like. It will be appreciated that where embodiments are described to use a computer-readable storage medium, other types of computer-readable storage media may be substituted for or used in addition to the computer-readable storage media described above.

The computer-readable media include cooperating or interconnected computer-readable media, which exist exclusively on a processing system or distributed among multiple interconnected processing systems that may be local to, or remote from, the processing system. The one or more memory devices can be coupled to, for example, one or more computing devices by one or more instructions, data, or power buses.

In an embodiment, circuitry may also include a computer-readable media drive configured to accept signal-bearing medium (e.g., computer-readable memory media, computer-readable recording media, or the like). In an embodiment, a program for causing a system or device to execute any of the disclosed methods can be stored on, for example, a computer-readable recording medium (CRMM), a signal-bearing medium, or the like.

The present application may also reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A and B" means "A and/or B", namely "A" alone, "B" alone or "A and B". Similarly, the phrase "at least one of A, B, and C," for example, means (A), (B), (C), (A and B), (A and C), (B and C), or (A, B, and C), including all further possible permutations when greater than three elements are listed.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. An antenna module for over-the-air testing, said antenna module comprising:
   a signal generation module;
   a measurement module; and
   an antenna,
   said signal generation module comprising a control input,
   said measurement module comprising an analog output,
   said antenna being assigned to said measurement module and said signal generation module,
   said measurement module being configured to perform an analog measurement,
   said signal generation module comprising a signal generator and a control circuit assigned to said control input, said control circuit being configured to receive a control signal via said control input, said control circuit being configured to process said control signal received via said control input, thereby controlling output of said signal generation module,
   wherein an integrative construction of said antenna module is provided as said signal generation module comprises said signal generator and said control circuit.

2. The antenna module according to claim 1, wherein said control circuit is configured to control output of said signal generation module by digital controlling.

3. The antenna module according to claim 1, wherein said control circuit is configured to control the output of said signal generation module fast than 100 ns.

4. The antenna module according to claim 1, wherein said control circuit is configured to control said signal generator.

5. The antenna module according to claim 1, wherein said signal generation module comprises a switchable output assigned to said signal generator, said control circuit being configured to control said switchable output.

6. The antenna module according to claim 1, wherein said measurement module comprises an additional digital output.

7. The antenna module according to claim 1, wherein said control input is an analog control input.

8. The antenna module according to claim 1, wherein said control input is a digital control input.

9. The antenna module according to claim 1, wherein said antenna is permanently connected with at least one of said measurement module and said measurement module.

10. The antenna module according to claim 1, wherein said antenna is connected with at least one of said measurement module and said measurement module via a switch.

11. The antenna module according to claim 1, wherein a splitter is provided via which said antenna is connected with said signal generation module.

12. The antenna module according to claim 1, wherein said measurement module is a power measurement module.

13. The antenna module according to claim 1, wherein said measurement module comprises at least one of a diode and a thermal measurement unit.

14. A test system for radio frequency testing, said test system comprising:
- a central unit and an antenna module, said central unit being connected with said antenna module, wherein said antenna module comprises:
- a signal generation module;
- a measurement module; and
- an antenna,
  - said signal generation module comprising a control input,
  - said measurement module comprising an analog output,
  - said antenna being assigned to said measurement module and said signal generation module,
  - said measurement module configured to perform an analog measurement,
  - said signal generation module comprising a signal generator and a control circuit assigned to said control input, said control circuit being configured to receive a control signal via said control input, said control circuit being configured to process said control signal received via said control input, thereby controlling output of said signal generation module, and
- wherein an integrative construction of said antenna module is provided as said signal generation module comprises said signal generator and said control circuit.

15. The test system according to claim 14, wherein several antenna modules are provided that are connected with said central unit.

16. An antenna module for over-the-air testing, said antenna module comprising:
- a signal generation module;
- a measurement module; and
- an antenna,
  - said signal generation module comprising a control input,
  - said measurement module comprising an analog output,
  - said antenna being assigned to said measurement module and said signal generation module,
  - said measurement module configured to perform an analog measurement,
  - said signal generation module comprising a signal generator and a control circuit assigned to said control input, said control circuit being configured to receive a control signal via said control input, said control circuit being configured to process said control signal received via said control input, thereby controlling output of said signal generation module,
  - wherein said signal generation module generates an analog radio frequency (RF) signal, and
- wherein said control circuit is configured to control output of said signal generation module by digital controlling.

* * * * *